US012623566B2

(12) United States Patent
Holcomb et al.

(10) Patent No.: US 12,623,566 B2
(45) Date of Patent: May 12, 2026

(54) NETWORK EDGE-BASED MULTIMODAL COMMUNICATION ARCHITECTURE FOR CONTROLLING ELECTRIC VEHICLE SUPPLY EQUIPMENT

(71) Applicant: PowerFlex Systems, LLC, San Diego, CA (US)

(72) Inventors: Chad Holcomb, Salt Lake City, UT (US); George Lee, Los Altos, CA (US); Zachary Ryan Gomez, Los Altos, CA (US); So Trinh, Daly City, CA (US); Kodie Nathaniel Toro, San Mateo, CA (US); Yazid Mazahreh, San Mateo, CA (US)

(73) Assignee: PowerFlex Systems, LLC, San Diego, CA (US)

( * ) Notice: Subject to any disclaimer, the term of this patent is extended or adjusted under 35 U.S.C. 154(b) by 221 days.

(21) Appl. No.: 18/357,126

(22) Filed: Jul. 23, 2023

(65) Prior Publication Data

US 2024/0174117 A1 May 30, 2024

Related U.S. Application Data

(60) Provisional application No. 63/385,606, filed on Nov. 30, 2022.

(51) Int. Cl.
*H04L 12/24* (2006.01)
*B60L 53/68* (2019.01)
(Continued)

(52) U.S. Cl.
CPC .............. *B60L 53/68* (2019.02); *H04L 45/54* (2013.01); *H04L 67/125* (2013.01); *H04L 69/18* (2013.01)

(58) Field of Classification Search
CPC .......... B60L 53/68; B60L 53/66; H04L 45/54; H04L 67/125; H04L 69/18; H04L 67/12
(Continued)

(56) References Cited

U.S. PATENT DOCUMENTS

| | | | | |
|---|---|---|---|---|
| 2012/0309455 A1* | 12/2012 | Klose | ...................... | B60L 53/68 |
| | | | | 455/557 |
| 2014/0152254 A1* | 6/2014 | Juhasz | ...................... | H02J 7/00 |
| | | | | 320/109 |

(Continued)

FOREIGN PATENT DOCUMENTS

| | | | | | |
|---|---|---|---|---|---|
| CA | | 2788521 A1 * | 8/2013 | .............. | B60L 53/62 |
| WO | WO-2020001011 A1 * | | 1/2020 | ......... | H04L 67/1095 |
| WO | WO-2023024956 A1 * | | 3/2023 | .............. | H04L 41/12 |

*Primary Examiner* — Ario Etienne
*Assistant Examiner* — Elizabeth Kassa
(74) *Attorney, Agent, or Firm* — Dinsmore & Shohl LLP

(57) ABSTRACT

Provided herein are techniques for managing charging stations with diverse communication capabilities. A system for EVSE management may include a first communication controller in communication with a first network to communicatively couple to a central control system, a second communication controller in communication with a second network to communicatively couple to a first EVSE charger, and a third communication controller in communication with a third network to communicatively couple to a second EVSE charger. A communication adapter may communicatively couple the first communication controller, the second communication controller, and third communication controller to receive a first message from the remote charging manager using a first application protocol, send the first message to the first EVSE charger using a second application protocol, receive a second message from the remote charging manager using the first application protocol, and send the second message to the second EVSE charger using a third application protocol.

13 Claims, 6 Drawing Sheets

(51) Int. Cl.

| | |
|---|---|
| *H04L 41/0803* | (2022.01) |
| *H04L 45/00* | (2022.01) |
| *H04L 67/125* | (2022.01) |
| *H04L 69/18* | (2022.01) |

(58) Field of Classification Search
USPC ........................................................ 709/230
See application file for complete search history.

(56) References Cited

U.S. PATENT DOCUMENTS

| | | | |
|---|---|---|---|
| 2015/0291049 A1* | 10/2015 | DeBoer, III ............ | B60L 53/16 |
| | | | 320/109 |
| 2016/0039301 A1* | 2/2016 | Igarashi .................. | B60L 53/66 |
| | | | 320/157 |
| 2019/0156384 A1* | 5/2019 | Khoo ....................... | B60L 53/31 |
| 2021/0268924 A1* | 9/2021 | Darade ................... | B60L 53/66 |
| 2022/0153156 A1* | 5/2022 | Goei ........................ | B60L 53/66 |
| 2022/0305927 A1* | 9/2022 | Haas ................. | H02J 13/00032 |
| 2023/0052150 A1* | 2/2023 | Shin ...................... | B60L 53/305 |
| 2023/0147695 A1* | 5/2023 | Earl ...................... | H02J 7/0048 |
| | | | 320/109 |
| 2024/0259482 A1* | 8/2024 | El-Batawy ............. | G05B 19/05 |

* cited by examiner

400

Receive a message, using a first protocol, for a
device in a system that manages charging stations
with a variety of capabilities
402

Determine a destination network for the message
404

Route the message using a second protocol
406

NETWORK EDGE-BASED MULTIMODAL COMMUNICATION ARCHITECTURE FOR CONTROLLING ELECTRIC VEHICLE SUPPLY EQUIPMENT

CROSS-REFERENCE TO RELATED APPLICATION

This application claims the benefit of and priority to U.S. Provisional Application Ser. No. 63/385,606, filed Nov. 30, 2022, which is hereby incorporated by reference in its entirety.

INTRODUCTION

Aspects of the present disclosure relate to management of charging infrastructure to support electrical vehicle fleets.

Currently there are many protocols used to communicate between electric vehicle supply equipment (EVSE) (sometimes referred to as a "charging station") and central control systems used to operate various aspects of the EVSE (e.g., for billing, for charge management, etc.). Additionally, the EVSE can use many different network interfaces (e.g., Wi-Fi®, Ethernet, cellular, Bluetooth®, ZigBee®, etc.) to communicate with the central control system. Generally, manufacturers of EVSE are vertically integrated. That is, the manufactures produce both the EVSE and the local and remote control equipment used to operate the EVSE. In these vertically integrated systems, the manufacturer controls both the protocol and the network interface used by the EVSE. Thus, integration of the systems into a charging site is relatively straightforward. However, different EVSE have different charging characteristics. For example, EVSE may vary in supported charging levels (e.g., as set forth in SAE J1772), maximum charging power (e.g., 1.9 kilowatts (kW), 6.6 kW, 19.2 kW, etc.), the charging current type (e.g. alternating current (AC), direct current (DC)), connector types (e.g., a SAE J1772-compliant connector, a CSS connector, a ChadeMo connector, etc.), and/or cord length, etc. Operators of charging sites that support multiple EVSEs often need chargers with different capabilities. This can be especially true of operators that manage fleets of vehicles with different capabilities and of different makes and models. It is difficult to incorporate different EVSE into a central charging solution. As such, there is a need to overcome these challenges to incorporate many different EVSE into a single central control solution so that adoption and use of environmentally beneficial EV vehicles can be accelerated

SUMMARY

Provided herein are techniques for managing charging stations with diverse communication capabilities. A system for EVSE management may include a first communication controller in communication with a first network to communicatively couple to a central control system, a second communication controller in communication with a second network to communicatively couple to a first EVSE charger, and a third communication controller in communication with a third network to communicatively couple to a second EVSE charger. A communication adapter may communicatively couple the first communication controller, the second communication controller, and third communication controller to receive a first message from the remote charging manager using a first application protocol, send the first message to the first EVSE charger using a second application protocol, receive a second message from the remote charging manager using the first application protocol, and send the second message to the second EVSE charger using a third application protocol.

Embodiments of a method include detecting, a new charging site device at a charging site that utilizes a communications protocol, determining the communications protocol for the new charging site device, and determining whether the communications protocol of the new charging site device is unique to the charging site. In response to determining that the communications protocol of the new charging site device is not unique to the charging site, embodiments may update a routing table to include the new charging site device, a communication network the new charging site device will utilize, and an association with currently existing communication hardware. In response to determining that the communications protocol is unique to the charging site, embodiments may update the routing table and a communication adapter in the multimodal communication device, receive a communication directed to the new charging site device, and convert the communication to the communications protocol. Some embodiments may send the communication to the new charging site device in the communications protocol.

Embodiments of a non-transitory computer-readable medium include computer-executable instructions that, when executed by a processor of a processing system, cause the processing system to detect a new charging site device at a charging site that utilizes a communications protocol, determine the communications protocol for the new charging site device, and determine whether the communications protocol of the new charging site device is unique to the charging site. In response to determining that the communications protocol of the new charging site device is not unique to the charging site, embodiments may update a routing table to include the new charging site device, a communication network the new charging site device will utilize, and an association with currently existing communication hardware. In response to determining that the communications protocol is unique to the charging site, embodiments may update the routing table and a communication adapter, receive a communication directed to the new charging site device, convert the communication to the communications protocol, and send the communication to the new charging site device in the communications protocol.

Other embodiments provide methods for performing the functions of the aforementioned systems described herein; non-transitory, computer-readable media comprising instructions that, when executed by a processors of a processing system, cause the processing system to perform the methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more embodiments.

DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
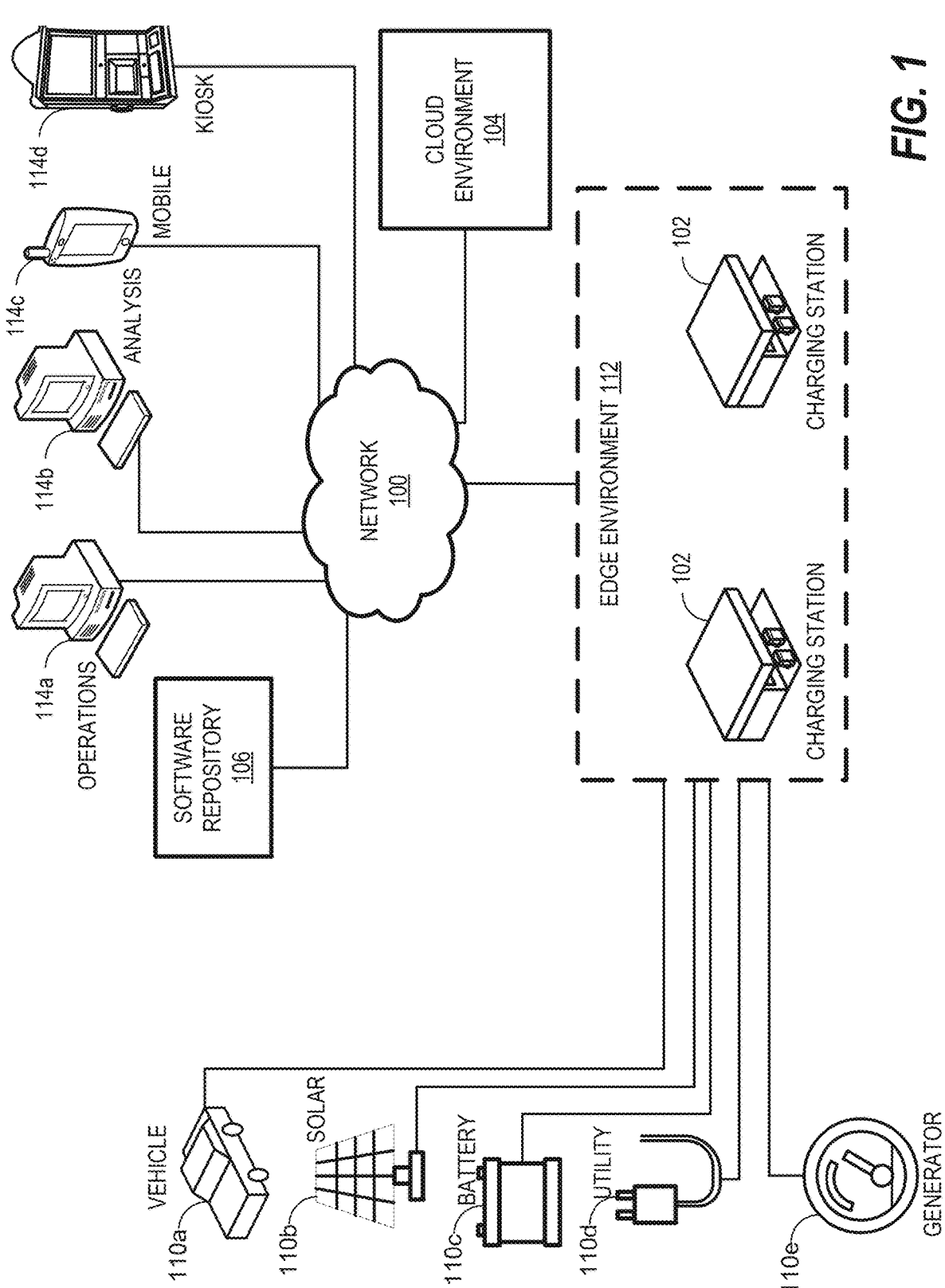
FIG. 1 depicts a computing environment for network edge-based multimodal communication, according to embodiments provided herein.

Aspects of the present disclosure provide apparatuses, methods, processing systems, and computer-readable mediums for management of charging infrastructure to support the electrical vehicle fleets.

Increasingly, distributed energy resources (DERs) are being used to provide power to charging sites that host EVSE chargers. DERs are typically small-scale power generation systems (e.g., solar panels, small natural gas or diesel-fueled generators, wind generators, etc.) operating locally to a charging site and produce power partially or wholly consumed by the EVSE chargers and related support equipment. DER control architecture and data acquisition systems need to control and monitor many EVSE chargers, often distributed across a geographic area, made by different manufactures, and using multiple modes of communications. Communications between EVSE chargers and a central control system in these types of installations typically use local area networks (e.g., Wi-Fi, (IEEE 802.11 b/g/n), etc.) personal area networks (e.g., ZigBee® 3.0, etc.) as well as hardwired communications over Ethernet cables. However, in a traditional installation with EVSE chargers with different capabilities, often multiple intermediary systems and/or multiple control systems it is often desired that these devices communicate with the EVSE. Traditionally, this makes integration into a single system difficult and risks missing information that is used to more efficiently control the power capacity provided by the DERs.

As described herein, a multimodal communication device operating at a charging site that hosts one or more charging stations is configured to communicate using different communications protocols and different networking interfaces (e.g., provide interoperability). The multimodal communication device facilitates communication with an energy management system and can be remotely configured to control a variety of EVSE chargers. When a charging site is not is not part of a vertically integrated system (e.g., the charging site includes charging stations from different manufacturers and/or charging stations form a different manufacturer than the control system, etc.), the multimodal communication device facilitates a central controller (e.g., a local and/or remote central controller, etc.) co-optimizing energy usage of the EVSE chargers. The multimodal communication device also facilitates integrating charging stations with different capabilities into a charging site-wide power management system. In some examples, the multimodal communication device may be extended to communicatively couple to on-site power generation sources (e.g., DERs such as photovoltaic (PV) power sources, etc.) and a battery energy storage system (BESS). Additionally, when the multimodal communication device is configured to communicate with the EVSE chargers (and, in some examples, DERs and BESSs) at a charging site, the central controller does not require knowledge of the specific communication configuration of any the on-site devices to incorporate them into the control and optimization scheme.

Example Environment

FIG. 1 depicts a computing environment for charge request modification, according to embodiments provided herein. As illustrated, the computing environment includes a network 100 that is coupled to an edge environment 112, a cloud environment 104, and a software repository 106. The network 100 may be configured as any wide area network (WAN, such as the internet, power network, cellular network, etc.), local network (e.g., LAN, Ethernet, Wireless-Fidelity, etc.).

The edge environment 112 may include and/or be coupled with one or more charging stations 102, such as charging station 102, each of which may include one or more EVSE. The charging station 102 may be configured to charge one or more electric vehicles (EV) and/or other electric devices. The charging station 102 may utilize any protocol of charging, communication, and/or control such as open smart charging protocol (OSCP), open charge point interface (OCPI), ISO 15118, OpenADR, etc. and may represent Level 1, Level 2, Level 3, and higher powered charging stations, as applicable.

As described with reference to FIG. 2, the edge environment 112 may be configured as an interface between the charging stations 102 and the network 100. Some embodiments may be configured such that the computing power at one or more of the charging stations 102 may be controlled dynamically (e.g., increased, decreased, limited, etc.) and the edge environment 112 may be configured to provide fast processing of data, as well as processing when access to the network 100 may be limited or unavailable.

The cloud environment 104 may be coupled to the edge environment 112 via the network 100 and may be configured for further processing of data, as described herein. While FIG. 1 depicts a single cloud environment 104 that serves a single edge environment 112, this is merely an example, as some embodiments may be configured such that the cloud environment 104 may serve a plurality of edge environments 112 that each serve one or more charging stations 102 and/or one or more energy sources 110.

Also coupled to the edge environment 112 are energy sources 110. The energy sources 110 may include a vehicle 110*a*, a solar device 110*b*, a battery 110*c*, a utility 110*d* (such as a coal plant, solar plant, wind farm, electrical grid, etc., which is a traditional reservoir of energy from where a site pulls to power buildings, EVSEs, and other electrical equipment), a generator 110*c*, and/or other sources of energy. While not an exhaustive list, the energy sources 110 may provide energy to the charging stations 102. In some embodiments, the charging stations 102 may send excess energy back to vehicle 110*a*, battery 110*c*, and/or to the utility 110*d*. Regardless, the edge environment 112 may monitor and/or modify the energy received from the energy sources 110 to be properly utilized by the corresponding charging station 102.

Also coupled to the network 100 is a software repository 106. The software repository 106 may be configured as a platform to program, store, manage, control changes, etc. to software that is implemented in the edge environment 112 and/or cloud environment 104. The software repository 106 may be configured as a proprietary service and/or may be provided by a third party, such as GitHub™.

Also depicted in FIG. 1 are ancillary devices 114. The ancillary devices 114 may include an operations device 114*a*, an analysis device 114*b*, a mobile device 114*c*, a kiosk 114*d*. and/or other devices. Specifically, the operations device 114*a* may be utilized to monitor and/or alter operations of the computing environment provided in FIG. 1. The analysis device 114*b* may analyze utilization, operation, charging, and/or other features of the computing environment. The mobile device 114*c* may represent an administrator device and/or a user device. As a user device, the mobile device 114*c* may initiate charging, payment, and/or perform other user-specific actions. As an administrator device, the mobile device 114*c* may perform administrative operations, analysis, and/or perform other actions. The kiosk 114*d* may be located at one of the charging stations 102 and/or remote therefrom and may provide user-specific or administrative actions, similar to that of the mobile device 114*c*. As will be understood, the ancillary devices 114 may each include a processor, a memory component, and/or other hardware and/or software for performing the functionality provided herein.

An Example Edge Management System

Figure 2:
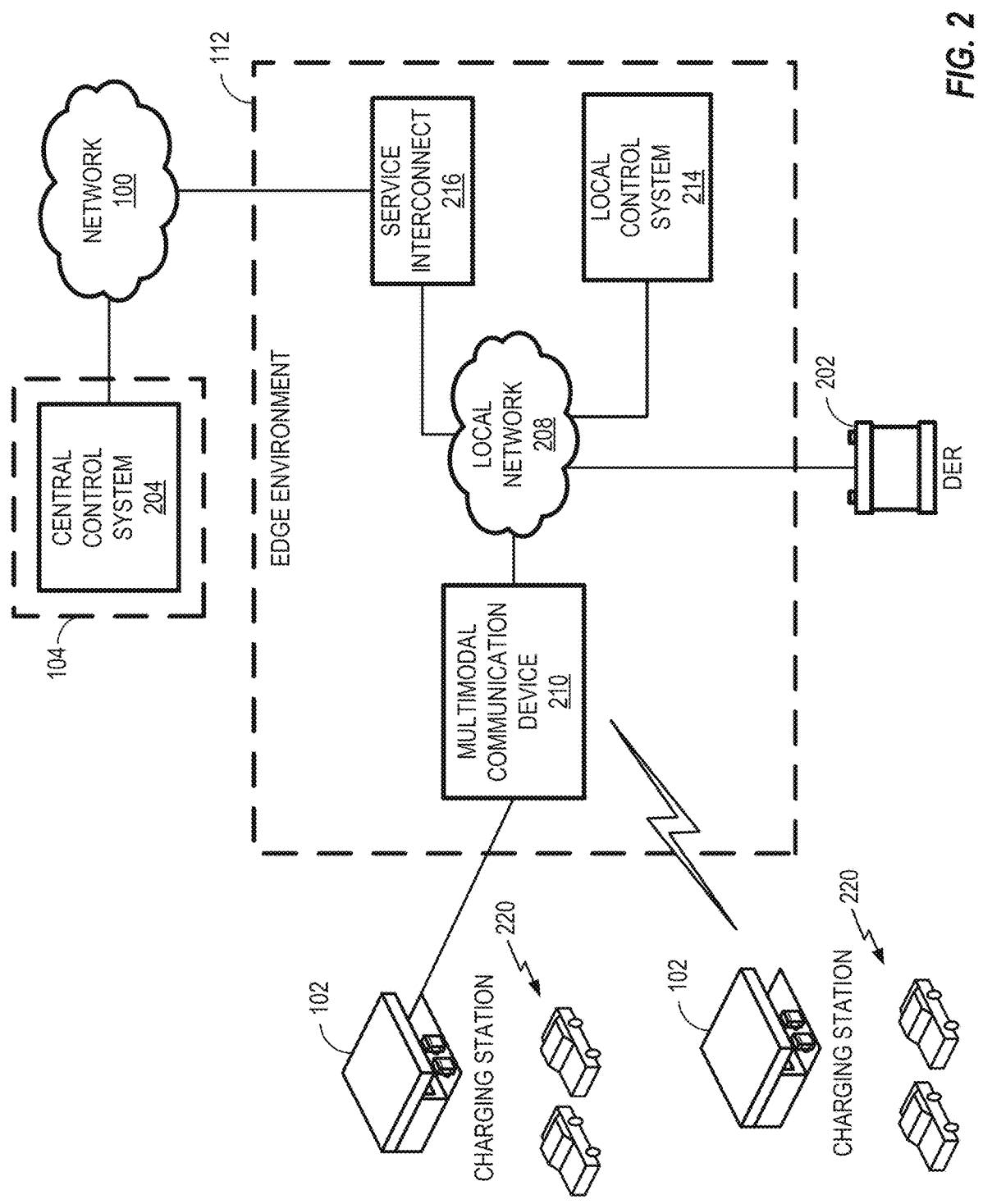
FIG. 2 depicts an example system that manages communication to charging stations and other support equipment, according to embodiments provided herein.

FIG. 2 depicts a system that manages communication between charging stations 102 and other support equipment (e.g., DER control systems, BESS control systems, etc.) and a central control system 204 operating in the cloud environment 104. The charging stations 102 are coupled to a local network 208 via one or more multimodal communication device 210 (sometimes referred to as a "core device") to route network traffic between the charging stations 102 and the local network 208.

The edge environment 112 is configured as an interface between the charging stations 102 (e.g., via the multimodal communication device(s) 210) and the cloud environment 104. As illustrated in FIG. 2, the edge environment 112 may serve as a communication hub between equipment located at a charging site (e.g., the charging stations 102, DER 202, etc.) through the local network 208. The local network 208 may be a wired or wireless network to facilitate communication between equipment operating in an edge environment 112. The edge environment 112 may include a local control system 214 that handles local control of the charging stations 102 and/or coordinates control of the charging stations 102 the central control system 204 operating in the cloud environment 104. In some examples, the local control system 214 is configured such that the charging stations 102 may be controlled dynamically (e.g., increased or decreased, limited, etc.) and may be configured to provide fast processing of data, as well as processing when access to the network 100 is limited or unavailable. For example, the local control system 214 may be configured as a charging management system (CMS) that controls (e.g., via generating pilot signals) charging current used by the charging stations 102 in view of power capacity limitations of the charging site. The local control system 214 may provide optimization, load management, coordination, data acquisition, and data historian services. The local control system 214 may communicate with central control system 204 in the cloud environment 104 to get, for example, optimization and load management set points for charging stations 102.

In the illustrated example, the multimodal communication device 210 is connected to the cloud environment 104 through a service interconnect 216, which may be configured for establishing an HTTP, TCP, and/or other type of communication with the cloud environment 104 via network 100 (e.g., the Internet, a virtual private network, etc.). For example, the service interconnect 216 may be a modem or gateway device that establishes communication with the external network 118.

The cloud environment 104 may provide dynamic hosting of services that form the central control system 204 that are operating on one or more virtual and/or physical servers (e.g., virtualized servers, virtualized containers, physical hardware, etc.). In some embodiments, central control system 204 coordinates operation of electric vehicles 220, charging stations 102, and/or local control systems 214 across multiple edge environments 112. The central control system 204 may include, for example, electric vehicle fleet management system (EVFMS) that monitors and controls dispatching of the electric vehicles 220 that operate from one or more charging sites. The central control system 204 may also include, for example, a central CMS to coordinate with the local control systems 214 to monitor and control power utilization across multiple charging sites.

The charging stations 102 may be different models with different charging capabilities. The charging stations 102 may also support different connections via different types of standards-based networks (e.g., local area wireless networks (including IEEE 802.11 a/b/g/n/ac or others), wide area networks (e.g., WiMAX (IEEE 802.16m), Wireless Gigabit (IEEE 802.11ad), etc.), personal area networks (e.g., Bluetooth®, etc.), mesh networks, and/or personal area networks (e.g., ZigBee®, Z-Wave®, etc.), etc.). Additionally, the charging stations 102 may support different application protocols (e.g., ModBus, DNP3, OCPP, etc.) for backend communication between the charging station 102 and a charging management system (e.g., the local control system 214, the central control system 204, etc.). For example, one charging station 102 may communicate via wireless local area network (WLAN) using the OCPP application protocol, while another charging station 102 may communicate via a mesh network.

The multimodal communication device 210 may be physically installed within communications range of the chargers in the charging stations 102. The multimodal communication device 210 are central processing devices that serve as the communications hub to communicatively connect, through one or more networks (e.g., Wi-Fi, ZigBee®, Ethernet, etc.), to the charging stations 102. The multimodal communication device 210, for example, dispatch set points to the charging stations 102 received from the central control system 204 and/or the local control system 214 via one or more application protocols (e.g., ModBus, DNP3, OCPP, proprietary protocols, etc.). As such, devices in the edge environment 112 (e.g., the local control system 214, etc.) and/or services operating in the cloud environment 104 (e.g., the central control system 204, etc.) do not need to be configured with specific information regarding the network connection used by the charging stations 102 or the application protocol used by the charging stations 102.

As a result, the multimodal communication device 210 provide a plug-in-play experience where, when a charging station 102 is connected to and configured for one of the multimodal communication device 210, the charging station 102 may be incorporated into a charging network control system. While the multimodal communication device 210 is described as providing interoperability for charging stations 102, the multimodal communication device 210 may also communicatively couple to other devices. That the central control system 204 and/or a local control system 214 may use these other devices to manage power capacity and usage at a charging site, such as power sources, utilities, and/or battery storage systems, etc. The multimodal communication device 210 overcome the technical challenges of integrating charging stations 102 into a unified power control system by providing, for example, a network endpoint capable of commutating with a variety of the charging stations 102 without requiring other devices on the network 100 being configured to communicate directly with the charging stations 102.

An Example Multimodal Communication Device

Figure 3:
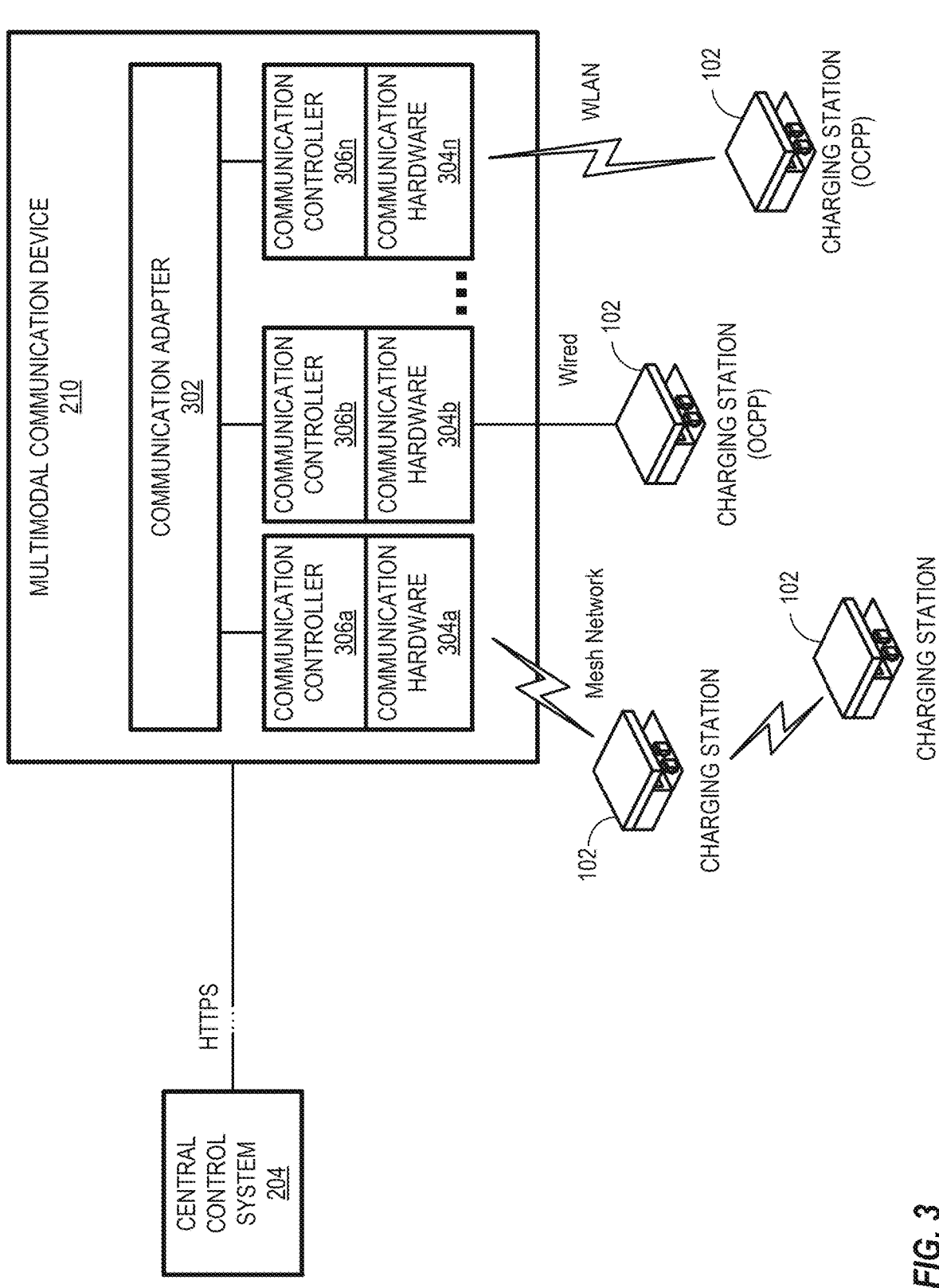
FIG. 3 illustrates an example multimodal communication device to manage communication for charging stations and other support equipment, according to embodiments provided herein.

FIG. 3 illustrates of a multimodal communication device 210 of FIG. 2 in more detail. In the illustrated example, the multimodal communication device 210 includes a communication adapter 302, communication hardware 304a through 304n (collectively "communication hardware 304"), and communication controllers 306a through 306n (collectively "communication controllers 306"). The communication hardware 304 may be configured as at least one physical network device that include hardware (e.g., antennas, radios, transceivers, processors, memory, connectors, integrated circuits, etc.) that implement the hardware aspects of a networking protocol, such as Wi-Fi®, ZigBee®, Bluetooth®, etc. The communication controllers 306 may be configured as software that enable communication using the corresponding communication hardware 304.

The communication adapter 302 receives messages (e.g., from the central control system 204, etc.) and routes the communication to the destination charging station 102 using the appropriate network protocols and the appropriate communications protocols. The communication adapter 302 may receive messages from the charging stations 102 and forward the messages to the cloud environment 104 using the appropriate network protocol and the appropriate communications protocol. As such, the charging stations 102 do not have to have the same network protocol and/or communications protocol to be able to communicate with the cloud environment 104. The communication controllers 306 may each operate using different network protocols and/or different communications protocols. From the network topology perspective of devices connected inside and/or to the edge environment 112, the communication adapter 302 may be considered the destination node and origination node for all charging stations 102 connected to the multimodal communication device 210.

Example Process for Communication with Charging Station

Figure 4:
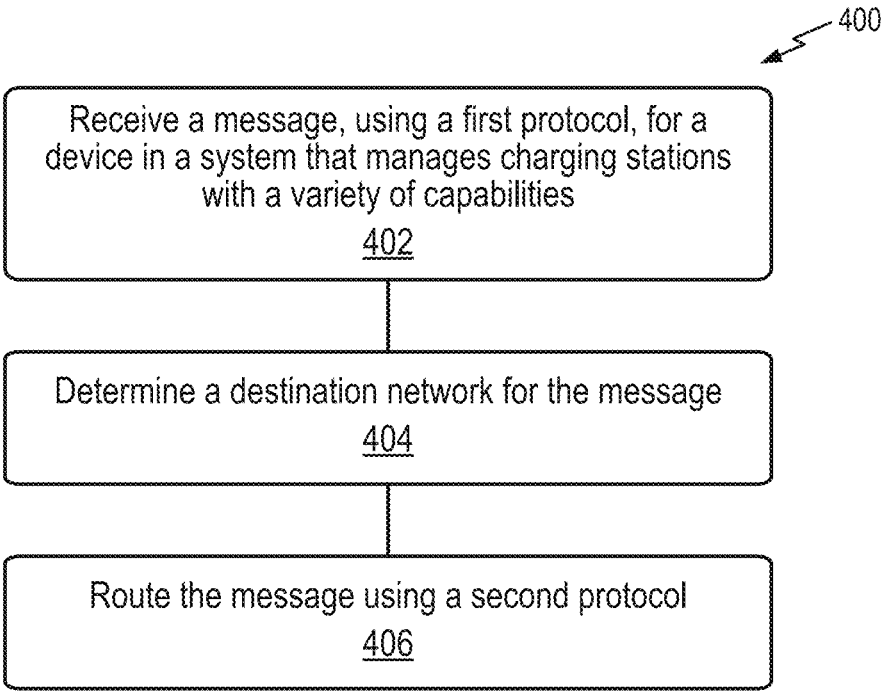
FIG. 4 is a process of an example method to manage communication with charging stations, according to embodiments provided herein.

FIG. 4 is flowchart of an example process 400 for managing communication with charging stations 102. In some examples, process 400 may be performed by the multimodal communication device 210.

Process 400 begins at step 402 with receiving a message using a first protocol, for a device in a system that manages charging stations 102 with a variety of capabilities. For example, the multimodal communication device 210 may receive message establishing a pilot signal from the central control system 204 over the network 100 that is destined for one of the charging stations 102 connected to the multimodal communication device 210. In such embodiments, the central control system 204 may, based on a configuration file in the message, know to send the message to the multimodal communication device 210, but may not be aware of (i) the type of network connection between the multimodal communication device 210 and the destination charging station 102, and/or (ii) the application protocol used by the charging station 102 for backend communication.

As another example, one of the charging stations 102 may send a message over a network connection that contains session data to be logged by a local control system 214. In such an example, the charging station 102 may not be aware of the network topology of the edge environment 112 or the application protocol used by the local control system 214. In such an example, the charging station 102 may use an application protocol proprietary to the manufacturer of the charging station 102 and the local control system 214 may use OCPP.

Process 400 continues at step 404 with determining a destination of the message received at step 402. For example, the multimodal communication device 212 may store a routing table that specifies which communication network each charging station 102 is connected and which application protocol each charging station 102 uses for backend communication. This routing table may include the information to forward the message to the specific charging station 102 to which the message is addressed.

Process 400 continues at step 406 with routing the message to the recipient over a different networking connection and/or using a different application protocol. For example, session data indicative that an electric vehicle 220 has plugged into a charging station 102 may be sent via a ZigBee® mesh network to the multimodal communication device 212 and the multimodal communication device 212 may send the session data to the central control system 204 using the OCPP protocol over a cellular network (e.g., via the service interconnect 216 of FIG. 2).

It should be noted that FIG. 4 depicts one example of a process 400, but others are possible, which may include additional, fewer, or alternative steps consistent with the various processes described herein.

Example Process for Edge-Based Multimodal Communication

Figure 5:
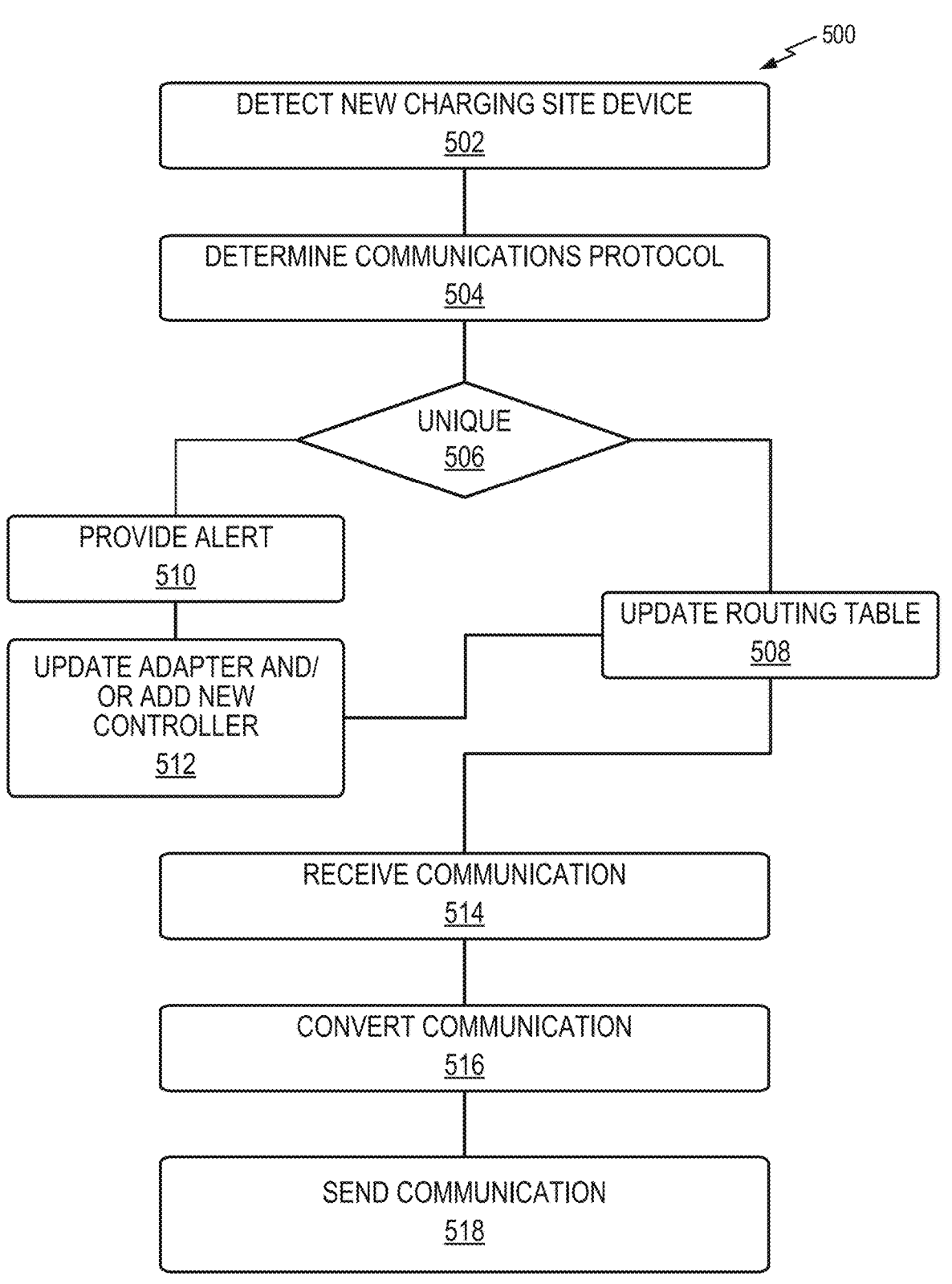
FIG. 5 depicts a process for edge-based multimodal communication, according to embodiments provided herein.

FIG. 5 depicts a process 500 for edge-based multimodal communication, according to embodiments provided herein. As illustrated, block 502, a new charging site device may be detected. The new charging site device may include a new charging station 102, DER 202, etc. In block 504, a determination may be made regarding the communications protocol for the new charging site device. This information may be obtained manually, such as by a site administrator and/or automatically, such as via an image capture or identification of the model of the new charging site device. In block 506, a determination may be made regarding whether the communications protocol of the new charging site device is unique to the charging site. If not, at block 508, the multimodal communication device 212 may update a routing table to include the new charging site device, the communication network the new charging site device will utilize, and an association with currently existing hardware, such as a currently existing communication adapter 302 and/or a currently existing communication hardware 304 (if not apparent from the protocol information).

If at block 506, the communications protocol of the new charging site device is unique to the charging site, in block 510, an alert may be sent to a site administrator to update the communication adapter 302 and/or add a new communication controller 306 to accommodate the new communications protocol. In block 512, once the communication adapter 302 is updated and/or a new communication controller 306 is added, the routing table may be updated with the appropriate information to provide for communication with the new charging site device. In block 514, a communication may be received that is directed to the new charging site device. In block 516, the communication may be converted to the communications protocol. In block 518, the communication bay be sent to the new charging site device in the communications protocol.

Some embodiments may be configured to receive a new communication from the new charging site device, determine a destination for the new communication, utilize the routing table to determine a destination communications protocol, convert the new communication to the destination communications protocol, and send the new communication to the destination. Similarly, some embodiments may be configured to determine that an existing charging site device has been removed and update the routing table to remove the existing charging site device.

Example Processing System for the Multimodal Communication Device

Figure 6:
FIG. 6 depicts an example processing system configured to perform the methods described herein, according to embodiments provided herein.
Figure 6:
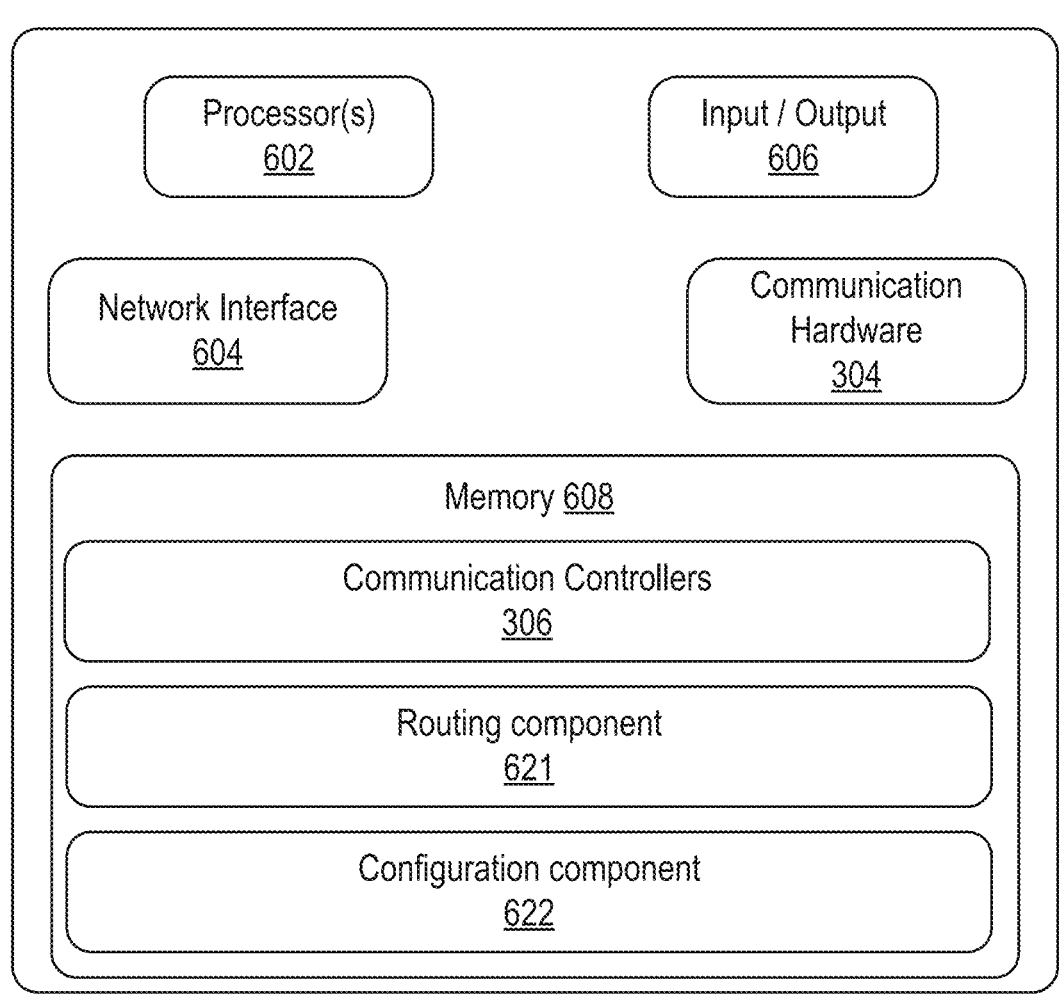

FIG. 6 depicts an example processing system 600 configured to perform the methods described herein.

Processing system 600 includes one or more processors 602. Generally, a processor 602 is configured to execute computer-executable instructions (e.g., software code) to perform various functions, as described herein.

Processing system 600 further includes a network interface 604, which generally provides data access to any sort of data network, including personal area networks (PANs), local area networks (LANs), wide area networks (WANs), the Internet, and the like to, for example, a network (e.g., the local network 208 of FIG. 2).

In the illustrated example, processing system 600 includes the communication hardware 304 to establish and/or connect the processing system 600 to various networks used by charging stations 102 at a charging site co-located with the processing system 600.

Processing system 600 further includes input(s) and output(s) 606, which generally provide a mechanism for providing data to and from processing system 600, such as via connection to computing device peripherals, including user interface peripherals.

Processing system 600 further includes a memory 608 comprising various components. In this example, memory 608 includes the communication controllers 306 that provide the software to enable the processing system 600 to communicate to networks established by the communication hardware 304. The memory 608 may also include a routing component 621 that may use configuration information, such as a routing table, to route messages between the network connected via the network interface 604 and the networks connected via the communication hardware 304. The memory 608 may also include configuration component 622 that configures information, such as the routing table, to route messages between the network connected via the network interface 604 and the networks connected via the communication hardware 304.

Processing system 600 may be implemented in various ways. For example, processing system 600 may be implemented within on-site, remote, or cloud-based processing equipment. Note that in various implementations, certain aspects may be omitted, added, or substituted from processing system 600.

Example Clauses

Implementation examples are described in the following numbered clauses:

Clause 1: A system for electric vehicle supply equipment (EVSE) management, the system comprising: a multimodal communication device that includes at least the following: a first communication controller in communication with a first network configured to communicatively couple to a central control system; a second communication controller in communication with a second network configured to communicatively couple to a first EVSE charger; a third communication controller in communication with a third network configured to communicatively couple to a second EVSE charger; a communication adapter communicatively coupled to the first communication controller, the second communication controller, and the third communication controller, the communication adapter configured to perform at least the following: receive a first message from the central control system using a first application protocol; convert the first message from the first application protocol to a second application protocol associated with the first EVSE charger; send the first message to the first EVSE charger using the second application protocol; receive a second message from the central control system using the first application protocol; convert the second message to the a third application protocol associated with the second EVSE charger; and send the second message to the second EVSE charger using the third application protocol.

Clause 2: The system of clause 1, wherein the communication adapter stores a routing table that includes an entry for at least one of the following: the first EVSE charger, the second EVSE charger, the second network for the first EVSE charger, and the third network for the second EVSE charger.

Clause 3: The system of clause 1 and/or 2, wherein to send the first message to the first EVSE charger, the communication adapter is configured to determine which of the first communication controller or the second communication controller that the first EVSE charger is communicably coupled to using the routing table.

Clause 4: The system of any of clauses 1 through 3, wherein the first, second, and third application protocols are each one of the following: ModBus protocol, a distributed network protocol, a hypertext transfer protocol, an open charge point protocol, or a ZigBee protocol.

Clause 5: The system of any of clauses 1 through 4, further comprising a service interconnect that is configured to establish communication with the central control system over a wide area network (WAN).

Clause 6: The system of any of clauses 1 through 5, further comprising a local control system that handles local control of the first EVSE charger and the second EVSE charger.

Clause 7: The system of any of clauses 1 through 6, further comprising communication hardware that includes at least one physical network device that implement hardware aspects of at least one of the following: the first application protocol, the second application protocol, or the third application protocol.

Clause 8: A method comprising: detecting, by a multimodal communication device, a new charging site device at a charging site that utilizes a communications protocol; determining, by the multimodal communication device, the communications protocol for the new charging site device; determining, by the multimodal communication device, whether the communications protocol of the new charging site device is unique to the charging site; in response to determining that the communications protocol of the new charging site device is not unique to the charging site, updating, by the multimodal communication device, a routing table to include the new charging site device, a communication network the new charging site device will utilize, and an association with currently existing communication hardware; in response to determining that the communications protocol is unique to the charging site, updating, by the multimodal communication device, the routing table and a communication adapter in the multimodal communication device; receiving, by the multimodal communication device, a communication directed to the new charging site device; converting, by the multimodal communication device, the communication to the communications protocol; and sending, by the multimodal communication device, the communication to the new charging site device in the communications protocol.

Clause 9: The method of clause 8, further comprising, in response to determining that the communications protocol is unique to the charging site, updating the communication adapter to accommodate the communications protocol.

Clause 10. The method of clause 8 and/or 9, wherein the new charging site device includes at least one of the following, a charging station or a distributed energy resource (DER).

Clause 11: The method of any of clauses 8 through 10, further comprising: receiving a new communication from the new charging site device; determining a destination for the new communication; utilizing the routing table to determine a destination communications protocol; converting the new communication to the destination communications protocol; and sending the new communication to the destination.

Clause 12: The method of any of clauses 8 through 11, further comprising: determining that an existing charging site device has been removed; and updating the routing table to remove the existing charging site device.

Clause 13: The method of any of clauses 8 through 12, further comprising, in response to determining that the communications protocol is unique, determining whether an existing communication controller is configured to utilize the communications protocol and, in response to determining that the existing communication controller is not configured to utilize the communications protocol, sending an alert to a site administrator to add at least one of the following: a new communication controller or new communication hardware to accommodate the communications protocol.

Clause 14: A non-transitory computer-readable medium comprising computer-executable instructions that, when executed by a processor of a processing system, cause the processing system to perform at least the following: detect a new charging site device at a charging site that utilizes a communications protocol; determine the communications protocol for the new charging site device; determine whether the communications protocol of the new charging site device is unique to the charging site; in response to determining that the communications protocol of the new charging site device is not unique to the charging site, update a routing table to include the new charging site device, a communication network the new charging site device will utilize, and an association with currently existing communication hardware; in response to determining that the communications protocol is unique to the charging site, update the routing table and a communication adapter; receive a communication directed to the new charging site device; convert the communication to the communications protocol; and send the communication to the new charging site device in the communications protocol.

Clause 15: The non-transitory computer-readable medium of clause 14, wherein the logic further causes the processing system, in response to determining that the communications protocol is unique to the charging site, to update the communication adapter to accommodate the communications protocol.

Clause 16: The non-transitory computer-readable medium of clauses 14 and/or 15, wherein the new charging site device includes at least one of the following, a charging station or a distributed energy resource (DER).

Clause 17: The non-transitory computer-readable medium of any of clauses 14 through 16, wherein the logic further causes the processing system to perform at least the following: receiving a new communication from the new charging site device; determining a destination for the new communication; utilizing the routing table to determine a destination communications protocol; converting the new communication to the destination communications protocol; and sending the new communication to the destination.

Clause 18: The non-transitory computer-readable medium of any of clauses 14 through 17, wherein the logic further causes the processing system to perform at least the following: determining that an existing charging site device has been removed; and updating the routing table to remove the existing charging site device.

Clause 19: The non-transitory computer-readable medium of any of clauses 14 through 18, wherein the logic further causes the processing system, in response to determining that the communications protocol is unique, to determine whether an existing communication controller is configured to utilize the communications protocol.

Clause 20: The non-transitory computer-readable medium of any of clauses 14 through 19, wherein the logic further causes the processing system, in response to determining that the existing communication controller is not configured to utilize the communications protocol, to send an alert to a site administrator to add at least one of the following: a new communication controller or new communication hardware to accommodate the communications protocol.

Additional Considerations

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method comprising:
detecting, by a multimodal communication device, a new charging site device at a charging site that utilizes a communications protocol;
determining, by the multimodal communication device, the communications protocol for the new charging site device;
determining, by the multimodal communication device, whether the communications protocol of the new charging site device is unique to the charging site;
in response to determining that the communications protocol of the new charging site device is not unique to the charging site, updating, by the multimodal communication device, a routing table to include the new charging site device, a communication network the new charging site device will utilize, and an association with currently existing communication hardware;
in response to determining that the communications protocol is unique to the charging site, updating, by the multimodal communication device, the routing table and a communication adapter in the multimodal communication device;
receiving, by the multimodal communication device, a communication directed to the new charging site device;
converting, by the multimodal communication device, the communication to the communications protocol, and
sending, by the multimodal communication device, the communication to the new charging site device in the communications protocol.

2. The method of claim 1, further comprising, in response to determining that the communications protocol is unique to the charging site, updating the communication adapter to accommodate the communications protocol.

3. The method of claim 1, wherein the new charging site device includes at least one of a charging station or a distributed energy resource (DER).

4. The method of claim 1, further comprising:
receiving anew communication from the new charging site device;
determining a destination for the new communication:
utilizing the routing table to determine a destination communications protocol, converting the new communication to the destination communications protocol, and
sending the new communication to the destination.

5. The method of claim 1, further comprising:
determining that an existing charging site device has been removed; and
updating the routing table to remove the existing charging site device.

6. The method of claim 1, further comprising,
in response to determining that the commemorations protocol is unique, determining whether an existing communication controller is configured to utilize the communications protocol and, in response to determining that the existing communication controller is not configured to utilize the communications, sending an alert to a site administrator to add at least one of a new communication controller or new communication hardware to accommodate the communications protocol.

7. A non-transitory computer-readable medium comprising computer-executable instructions that, when executed by a processor of a processing system, cause the processing system to:

detect a new charging site device at a charging site that utilizes a communications protocol, determine the communications protocol for the new charging site device;

determine whether the communications protocol of the new charging site device is unique to the charging site;

in response to determining that the communications protocol of the new charging site device is not unique to the charging site, update a routing table to include the new charging site device, a communication network the new charging site device will utilize, and an association with currently existing communication hardware;

in response to determining that the communications protocol is unique to the charging site, update the routing table and a communication adapter, receive a communication directed to the new charging site device:

convert the communication to the communications protocol; and send the communication to the new charging site device in the communications protocol.

8. The non-transitory computer-readable medium of claim 7, wherein the computer-executable instructions further cause the processing system to, in response to determining that the communications protocol is unique to the charging site, update the communication adapter to accommodate the communications protocol.

9. The non-transitory computer-readable medium of claim 7, wherein the new charging site device includes at least one of a charging station or a distributed energy resource (DER).

10. The non-transitory computer-readable medium of claim 7, wherein the computer-executable instructions further cause the processing system to:

receive a new communication from the new charging site device;

determine a destination for the new communication;

utilize the routing table to determine a destination communications protocol;

convert the new communication to the destination communications protocol; and send the new communication to the destination.

11. The non-transitory computer-readable medium of claim 7, wherein the computer-executable instructions further cause the processing system to:

determine that an existing charging site device has been removed; and update the routing table to remove the existing charging site device.

12. The non-transitory computer-readable medium of claim 7, wherein the computer-executable instructions further cause the processing system to, in response to determining that the communications protocol is unique, determine whether an existing communication controller is configured to utilize the communications protocol.

13. The non-transitory computer-readable medium of claim 12, wherein the computer-executable instructions further cause the processing system to, in response to determining that the existing communication controller is not configured to utilize the communications protocol, send an alert to a site administrator to add at least one of a new communication controller or new communication hardware to accommodate the communications protocol.

* * * * *